No. 796,794. PATENTED AUG. 8, 1905.
J. BAUR.
DUSTING MACHINE.
APPLICATION FILED NOV. 4, 1904.
2 SHEETS—SHEET 1.
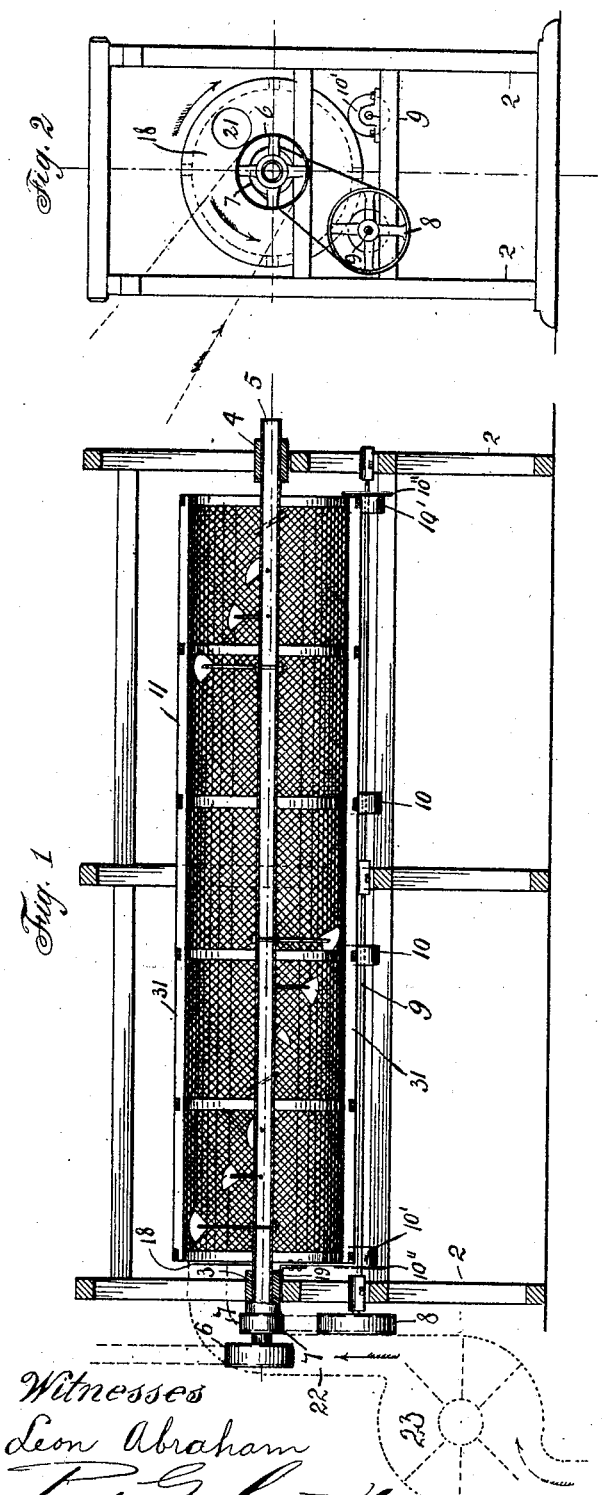
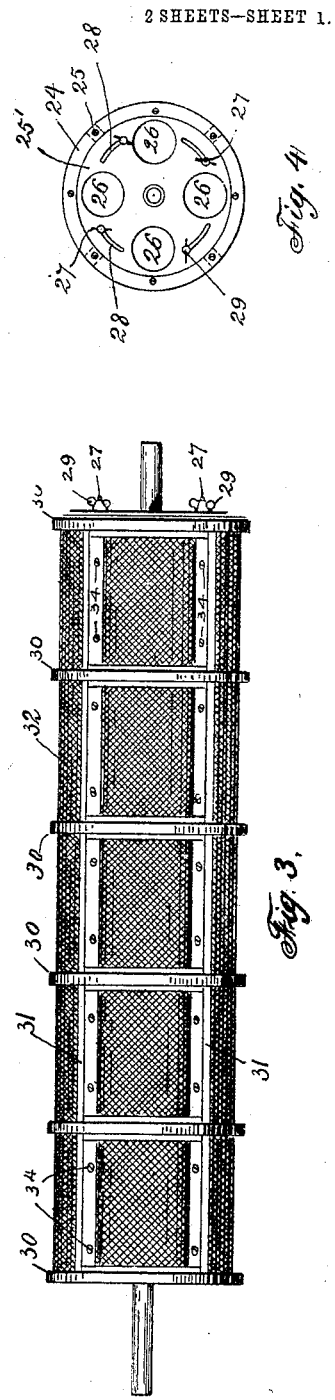
Witnesses
Leon Abraham
Paul Gerhardt
Inventor
John Baur
By Robt Klotz
Atty

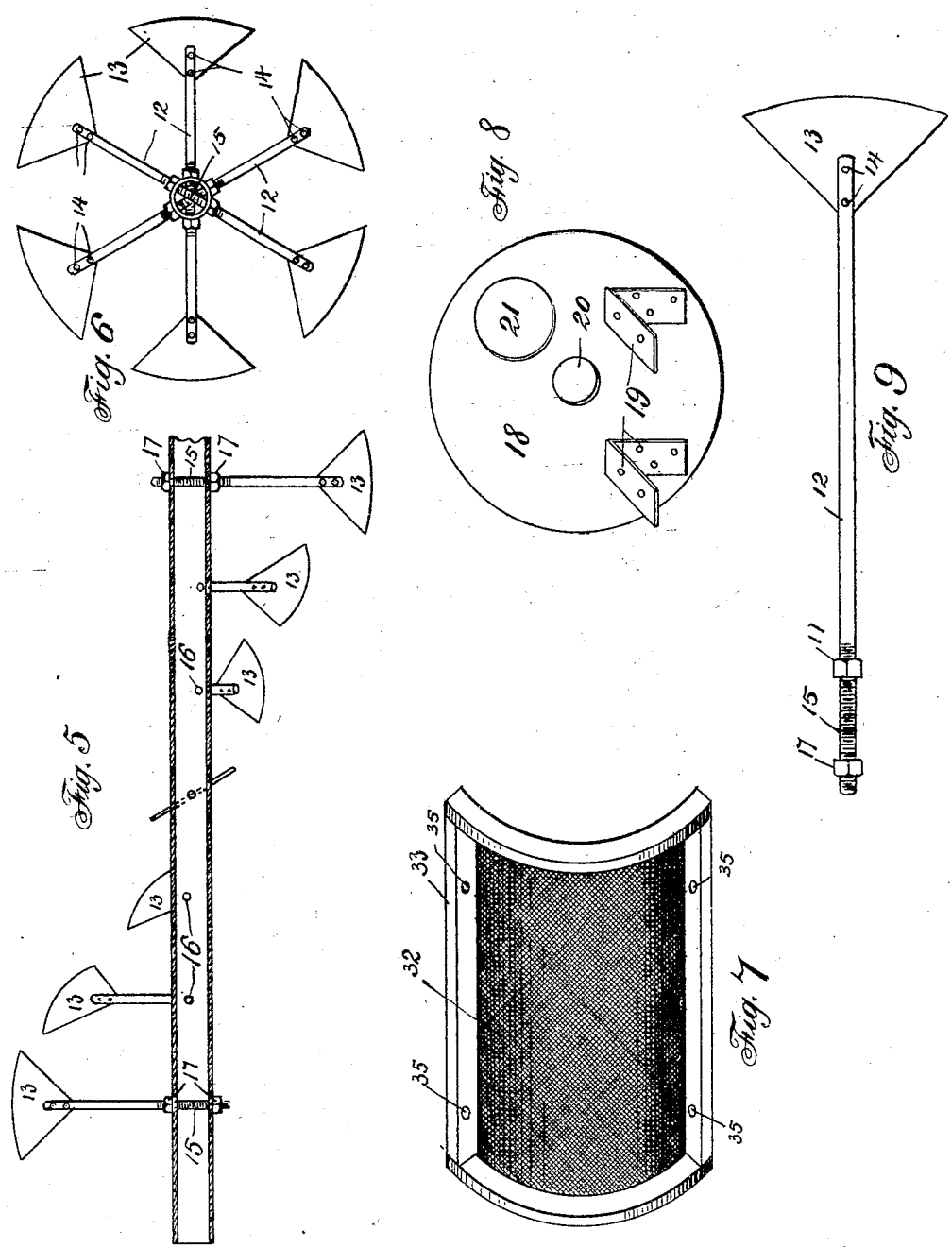

UNITED STATES PATENT OFFICE.

JOHN BAUR, OF CHICAGO, ILLINOIS.

DUSTING-MACHINE.

No. 796,794. Specification of Letters Patent. Patented Aug. 8, 1905.

Application filed November 4, 1904. Serial No. 231,355.

*To all whom it may concern:*

Be it known that I, JOHN BAUR, a citizen of the United States, residing at Chicago, Cook county, Illinois, have invented certain new and useful Improvements in Dusting-Machines, of which the following is a specification.

This invention has for its object to provide a machine capable of thoroughly dusting and beating any material light enough to be moved by means of a blast of air, and is particularly adapted for cleaning or dusting fibers and the like; and the invention consists in the novel construction and combination of parts hereinafter described in detail, illustrated in the drawings, and incorporated in the claims.

In the drawings, Figure 1 is an elevation of a machine embodying my invention shown partly in longitudinal vertical section. Fig. 2 is a view of the inlet end of the machine. Fig. 3 is a view of the drum in elevation. Fig. 4 is an end view of the drum. Fig. 5 is a view of the beater-shaft and beaters, the shaft being shown in longitudinal section. Fig. 6 is an end view thereof. Fig. 7 is an enlarged perspective view of one of the panels of the drum. Fig. 8 is a view of the stationary drumhead, and Fig. 9 is an enlarged view of one of the beaters.

Referring to the drawings, 2 represents a casing in which are shaft-bearings 3 and 4 for the shaft 5, having a belt-pulley 6 thereon, to which power is transmitted from any suitable source. The shaft 5 carries also a driving-pulley 7, transmitting rotary movement to a pulley 8 on a rotary shaft 9, carrying friction-wheels 10 10', which rotate drum 11, loosely mounted on shaft 5, rotated by the pulley 6. Arranged in spiral formation on shaft 5 are a series of arms 12, carrying beater-blades 13, preferably riveted fast to arms 12 by means of rivets 14. Each of the arms 12 has a threaded shank portion 15 passing through apertures 16 in the shaft 5, and said shank portion is secured to the shaft by means of nuts 17 17, which permit rotary adjustment of each arm 12 for the purpose of inclining the blade 13 at a suitable angle relative to its plane of rotation or arranging it parallel thereto for the purposes hereinafter referred to.

The end of drum 11 which is adjacent to the pulleys 6 and 7 is closed by means of a stationary head 18, Fig. 8, secured to the framework 2 by means of brackets 19 19. The head 18 has an opening 20 for the shaft 5 and an opening 21 for a spout 22 of a centrifugal fan 23 (shown by dotted lines, Fig. 1) or other suitable feeding device for forcing the substance to be dusted into the drum 11. The opposite end of drum 11 is closed by a head 24, fastened to the rim of the drum by means of screws 25. On the drum 24 is rotatively mounted a disk 25', and through said disk and head 24 are registering apertures 26. A series of threaded studs 27 are secured to the head 24 and project through slots 28, arranged concentrically in disk 25. "Butterfly-nuts" 29 have threaded engagement with the studs 27 and clamp the disk 25 upon the head 24. By rotating the disk 25 the apertures 26 may be partially closed to limit the volume of air and dusted material escaping through said openings. The drum 11 is composed of a series of hoops or rings 30 and longitudinal ribs 31, supporting a web or open screen 32. One side of the drum is provided with a series of panels 33, fastened to the ribs 31 by means of screws 34 passing through screw-holes 35 in the framework of each panel. By removing one or more of these panels the interior of the drum is made accessible for cleaning or repairs. The wheels 10' are provided with flanges 10'', engaging the respective ends of the drum 11 to prevent longitudinal movement thereof.

The operation of my invention is as follows: Shaft 5 is rotated at a comparatively high rate of speed in one direction, (indicated by inner arrow in Fig. 2,) and the drum 11 is rotated on said shaft in the opposite direction by the friction-wheels 10 10' on shaft 9, driven by pulley 8, receiving its motion from pulley 7 and a connecting-belt. As fibers or other suitable material are forced through the opening 21 in the stationary head 18 they will be caught by the rapidly-rotating beaters 13. As these beaters are inclined, as shown, the material will slip from beater to beater under the blast of air through opening 21 and be gradually forced toward openings 26. By the time the fibers or other material reach said openings they will be thoroughly cleaned and dusted. The greater part of the dust and dirt will find its way out through the screening material 32 of the drum 11 and fall to the bottom of the casing 2. If the fibers travel too fast through the drum, the openings 26 may be partly closed by rotating the disk 25 after loosening the nuts 29, or the beater-blades 13 may be adjusted with their faces nearer at right angles to the shaft 5. It is obvious that these blades themselves set up a strong current of air when their faces are inclined toward the path of movement through the drum. The adjustments of the blades 13 and openings 26, irrespective of the force of the blast through opening 21, modify within a very large range the speed of travel through the drum and the degree or duration of force exerted upon the material by the beaters and the current of air.

It is obvious that my invention is adapted for a large number of analogous uses and that its utility is not confined to the dusting and cleaning of fibers. It is further obvious that modifications may be made in the embodiment of my invention, and I therefore do not wish to confine same to the specific construction herein shown and described.

What I claim as new, and desire to secure by Letters Patent, is—

1. The combination with a rotating shaft and a drum rotatably mounted on said shaft, of a series of beater-arms carrying blades, the latter being adjustable angularly with relation to said shaft, means for forcing a blast of air through said drum from one end thereof, and means at the opposite end of said drum for varying the force or volume of said blast.

2. The combination with a drum, of a shaft upon which said drum is loosely mounted, arms carrying beater-blades arranged along said shaft within said drum, means for adjusting said blades at various angles relatively to said shaft, means for forcing a blast of air and a body of material through said drum, an outlet-opening in the end of said drum and means for varying the size of said outlet-opening.

3. The combination with a casing, of a shaft, a cylindrical receptacle loosely mounted on said shaft, said receptacle having an open or screen periphery, a series of arms, mounted for rotary adjustment, along said shaft, said arms being arranged in spiral order, blades upon said arms, means for forcing air and material through said drum, an outlet, variable in size, for said air and material, and means for rotating said shaft and receptacle independently.

4. The combination with a cylindrical receptacle, of a shaft forming the axis of said drum and rotatable relatively thereto, a stationary head for one end of said receptacle, a material and air inlet therethrough, a series of arms having beater-blades arranged along said shaft within said receptacle, said blades being adjustable, a perforated head in the opposite end of said receptacle serving as an outlet, a second shaft carrying friction-wheels bearing against the periphery of said drum and adapted to rotate the latter, and means for rotating said shafts.

In testimony whereof I have hereunto set my hand in the presence of two subscribing witnesses.

JOHN BAUR.

Witnesses:
LEON ABRAHAM,
A. KOETSCHAN, Jr.